United States Patent [19]

Good et al.

[11] 3,847,323

[45] Nov. 12, 1974

[54] FLASH REMOVAL MECHANISM

[75] Inventors: William E. Good, Cinnaminson, N.J.; Leonard DiGrasso, Philadelphia, Pa.

[73] Assignee: Kelsey-Hayes Company, Romulus, Mich.

[22] Filed: Jan. 2, 1973

[21] Appl. No.: 320,256

[52] U.S. Cl. .................. 228/3, 29/470.1, 29/481, 228/4, 228/13
[51] Int. Cl. ............................................ B23k 21/00
[58] Field of Search .................. 228/3, 4, 13, 19; 29/470.1, 475, 480, 481; 140/113; 83/914; 219/57

[56] References Cited
UNITED STATES PATENTS

| | | | |
|---|---|---|---|
| 3,093,018 | 6/1963 | Rozmus | 228/3 |
| 3,340,596 | 9/1967 | Razmus | 29/470.1 |
| 3,438,561 | 4/1969 | Calton | 228/13 |
| 3,621,176 | 11/1971 | Valente | 219/57 |

Primary Examiner—J. Spencer Overholser
Assistant Examiner—Robert J. Craig
Attorney, Agent, or Firm—Harness, Dickey & Pierce

[57] ABSTRACT

A die set for a coldwelding machine or the like that is particularly adapted for removing the flash or upset material from around the welded area. The die set includes dies having first workpiece receiving cavities that are sized to grip a workpiece and form upsets when the pieces are welded to each other by relative movement of the dies. A second series of cavities are formed in the dies one of which grips the welded workpiece and the other of which slidably supports the welded workpiece. A cutting edge is formed adjacent the cavity that slidably supports the workpiece for shearing the flash from the welded area.

5 Claims, 4 Drawing Figures

PATENTED NOV 12 1974

3,847,323

FLASH REMOVAL MECHANISM

BACKGROUND OF THE INVENTION

This invention relates to a mechanism for removing flash from a welded workpiece and more particularly to a die for removing flash from coldwelded parts.

In many forms of metal joining techniques such as pressure welding, either hot or cold, or flash welding, an area of upset is formed adjacent the joined area. In many instances this upset or "flash" as it is commonly known is objectionable and must be removed.

It is a principal object of this invention to provide an improved mechanism for removing flash from workpieces.

It is another object of the invention to provide a mechanism that may be used to weld workpieces together and also remove flash from adjacent the weld area.

SUMMARY OF THE INVENTION

This invention is adapted to be embodied in a mechanism for removing flash from welded workpieces or the like. The mechanism includes a first pair of dies having facing surfaces that are adapted to be moved toward and away from each other. The facing surfaces define a cavity that is adapted to grippingly engage a workpiece. Second die means are provided for defining a cavity that is adapted to losely receive the workpiece. A cutting surface is defined by the second die means around their cavity. The second die means is reciprocal in the direction of its cavity for bringing the cutting edge into shearing engagement with a workpiece gripped in the cavity of the first pair of dies and slidably received in the cavity of the second die means.

DETAILED DESCRIPTION OF THE PREFERRED EMBODIMENT

Figures 1, 2, 3, 4:
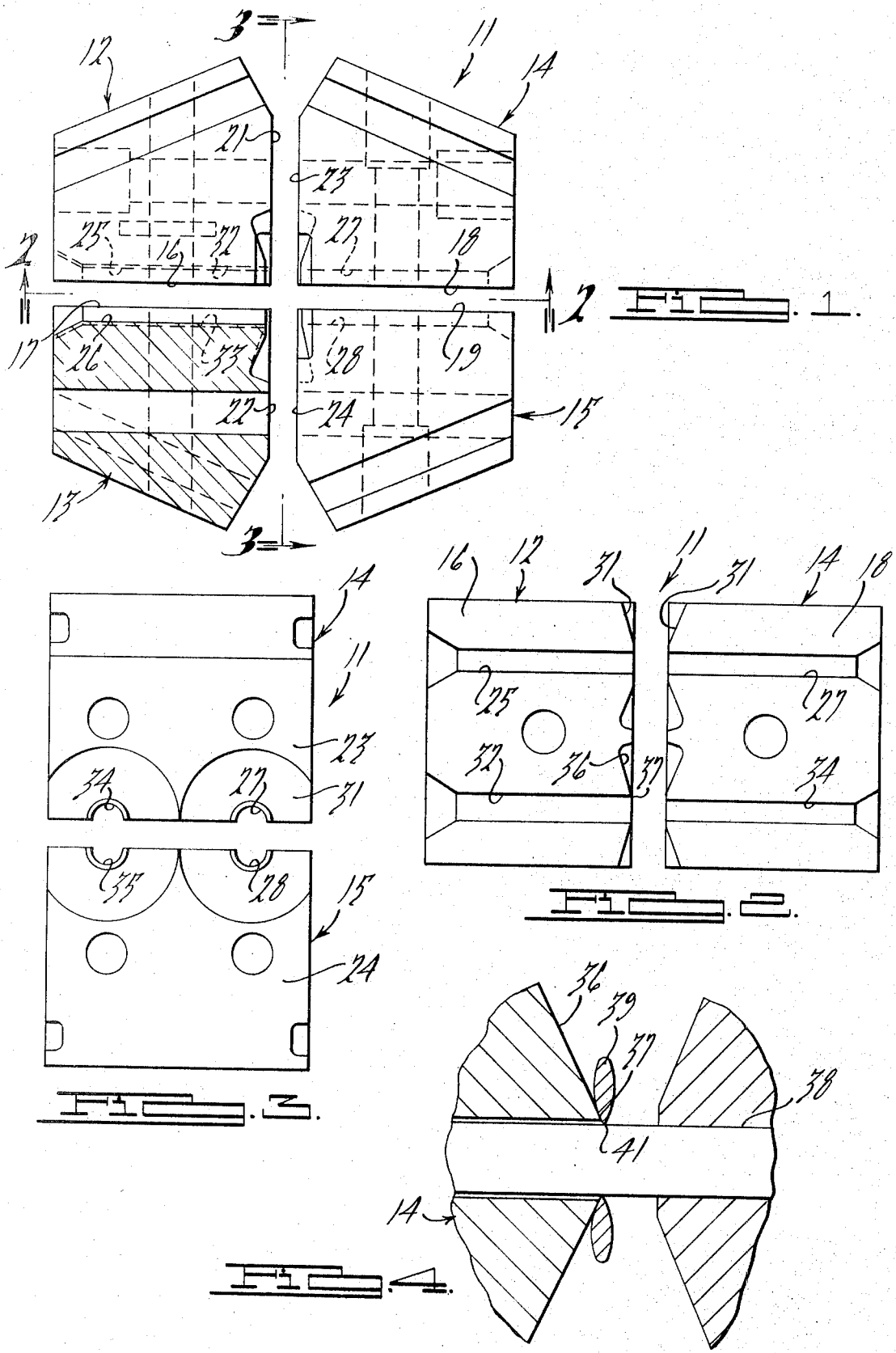
FIG. 1 is a top plan view of a die set for a coldwelding mechanism, which die set embodies the invention and in which one of the dies has been illustrated in cross section.
FIG. 2 is a side elevational view taken in the direction of the line 2—2 in FIG. 1.
FIG. 3 is an elevational view taken in the direction of the line 3—3 in FIG. 1.
FIG. 4 is an enlarged cross sectional view of the dies showing the flash shearing operation.

A die set embodying this invention is identified generally by the reference numeral 11. The die set 11 is comprised of a first pair of dies 12 and 13 and a second pair of dies 14 and 15. The dies of the pairs 12, 13 and 14, 15 have respective facing surfaces 16, 17 and 18, 19. Furthermore, the pair of dies 12 and 13 have surfaces 21 and 22 that face respective surfaces 23 and 24 of the pair of dies 14 and 15. The die set 12 is adapted to be used in a coldwelding mechanism in which the dies are sequentially operated in a manner which brings the surfaces 16 and 17 and 18 and 19 into gripping engagement with a workpiece, from an opened position, as shown in the figures, the mechanism also brings the surfaces 21 and 22 into engagement with the surfaces 23 and 24 once the workpieces are gripped to effect an upset or, a shearing action, as will become apparent. The mechanism for operating the dies forms no part of this operation and for this reason will not be described in detail. Reference may be had to any of the following U.S. Letters Patent for a description of a suitable actuating mechanism for the die set 11:

U.S. Pat. No. 2,863,344 issued Dec. 9, 1958 in the name of William A. Barnes, U.S. Pat. No. 2,909,086 issued Oct. 20, 1959 in the name of William A. Barnes et al., U.S. Pat. No. 2,909,951 issued Oct. 27, 1959 in the name of Walter J. Rozmus et al., U.S. Pat. No. 2,932,221 issued Apr. 12, 1960 in the name of William A. Barnes et al., U.S. Pat. No. 3,044,328 issued July 17, 1962 in the name of Stanley A. Zysk, U.S. Pat. No. 3,606,131 issued Sept. 20, 1971 in the name of Walter J. Rozmus.

The facing surfaces 16, 17 and 18, 19 of the pairs of dies 12, 13 and 14, 15 have respective cavities 25, 26 and 27, 28. The cavities 25, 26 and 27, 28 are sized to grippingly engage a workpiece such as a wire that is to be welded. The facing surfaces 21, 22 and 23, 24 of the dies 12, 13, and 14, 15 are formed with respective recesses 31 around the workpiece receiving cavities 25, 26, 27 and 28 which recesses are adapted to receive the upset or flash from the workpieces as they are welded. The cavities 31 are configured so as to form a relatively thin juncture of material around the welded area which may be easily cut or severed.

Immediately beneath the cavities 25, 26, 27 and 28, the dies 12, 13, 14 and 15 are formed with further cavities 32, 33, 34 and 35, respectively. The cavities 34, and 35 are substantially the same size as the cavities 25, 26, 27 and 28 so that when the faces 18 and 19 of the dies 14 and 15 are in engagement the workpiece or wire will be tightly gripped by the pair of dies 14 and 15. The cavities 32 and 33 are slightly larger in size so that the workpiece will be slidably supported in these cavities when the faces 16 and 17 of the dies 12 and 13 are held in engagement.

A cavity 36 is formed in the faces 21 and 22 of the dies 12 and 13 around the periphery of the cavities 32 and 33. These cavities define a relatively sharp cutting edge 37 at the juncture between the cavities.

In operation, wires are placed in the cavities 25, 26 and 27, 28 and are welded, preferably through a multiple upset technique, as is well known in this art. The resulting welded workpiece is indicated by reference numeral 38 in FIG. 4 and has a flash area 39 formed in the area where the weld was preformed. The flash 39 is connected to the workpiece 38 by a relatively thin area, indicated by the reference numeral 41 which is defined by the shape of the cavities 31.

After the workpiece 38 has been welded it is removed from the cavities 25, 26, 27 and 28 by opening the die set 11 to the position shown in FIG. 1. The workpiece 38 is then moved into registry with the cavities 32, 33, 34 and 35 with the flash area 38 being disposed at a spaced distance to the die faces 23 and 24 as shown in FIG. 4. The die set 11 is then again operated through its normal cycle with the surfaces 16, 17 and 18, 19 of the dies 12, 13 and 14, 15 being brought into engagement with each other. The workpiece 38 will then be clamped by the dies 14 and 15 and slidably supported within the cavities 32 and 33 of the dies 12 and 13. As has been described, during the continued cycle of the welding machine the pair of dies 12, 13 is moved toward the pair of dies 14, 15. When this occurs, the workpiece 38 will be retained in the dies 14 and 15 and the dies 12 and 13 will slide toward the dies 14 and 15 until the cutting edge 37 engages the flash 39 contiguous to the area 41. The flash 39 will then be sheared from around the weld area leaving a clean weld.

In the illustrated embodiment the cavity 36 has a generally conical shape terminating at the cutting edge 37. In some embodiments a semi-spherical shape may be used that terminates adjacent the cavities 32 and 33 to form the cutting edge. Alternatively, an offset cavity may be used so that one portion of the weld flash is sheared before the other. Such an offset arrangement will reduce the unit forces required to effect the shear. Also, in the described embodiment the weld flash removal portion of the die set was used in combination with dies that perform the welding function. Such dual use may be eliminated by providing separate welding and separate flash removal dies. The flash removal technique described may also be used in conjunction with removing flash from welds that have been made in other manners. Various other changes may be made without departing from the spirit and scope of the invention, as defined by the appended claims.

We claim:

1. A mechanism for effecting welds and for removing flash from the resulting welded workpiece or the like comprising a first pair of dies having facing surfaces adapted to be moved toward and away from each other, said facing surfaces defining a first cavity adapted to grippingly engage a workpiece, and a second pair of dies having facing surfaces adapted to be moved toward and away from each other, said facing surfaces of said second pair of dies defining a second cavity adapted to receive the workpiece, said second cavity being of a larger dimension than the workpiece for receiving the workpiece with a clearance, a cutting surface defined by said second pair of dies around said second cavity thereof, said second pair of dies being reciprocal in the direction of the cavity for bringing said cutting edge into shearing engagement with a workpiece gripped in said first cavity of said first pair of dies and slidably received in said second cavity of said second pair of dies for shearing flash therefrom and third and fourth cavities formed, respectively, by said first and second pairs of dies, said third and fourth cavities being adapted to grippingly engage the workpiece for forming an upset therein in response to reciprocal movement of said pairs of dies.

2. A mechanism as set forth in claim 1 wherein the cutting edge is formed by a conical surface formed in a face of the second pair of dies at a terminus of the second cavity.

3. A mechanism as set forth in claim 1 wherein the cutting edge is formed by an arcuate surface formed in a face of the second pair of dies around the second cavity.

4. A mechanism as set forth in claim 1 wherein the cutting edge is formed by a portion of the second pair of dies offset in the direction of reciprocation thereof.

5. A mechanism as set forth in claim 1 wherein the third and fourth cavities are formed in the same facing surfaces of the respective pair of dies as the first and second cavities.

* * * * *